United States Patent
Horvath et al.

(10) Patent No.: US 12,272,243 B2
(45) Date of Patent: Apr. 8, 2025

(54) METHOD AND SYSTEM FOR REPORTING THE BLOCKING OF A CHARGING STATION

(71) Applicant: AUDI AG, Ingolstadt (DE)

(72) Inventors: Jürgen Horvath, Pfakofen (DE); Franz Lankes, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 343 days.

(21) Appl. No.: 17/980,458

(22) Filed: Nov. 3, 2022

(65) Prior Publication Data

US 2023/0137676 A1    May 4, 2023

(30) Foreign Application Priority Data

Nov. 4, 2021 (DE) .......................... 102021128710.3

(51) Int. Cl.
  *G08G 1/14* (2006.01)
  *B60L 53/65* (2019.01)
  (Continued)

(52) U.S. Cl.
  CPC .............. *G08G 1/142* (2013.01); *B60L 53/65* (2019.02); *G06V 20/52* (2022.01); *G06V 20/625* (2022.01);
  (Continued)

(58) Field of Classification Search
  CPC ...... G08G 1/142; G08G 1/144; G08G 1/0175; G08G 1/146; B60L 53/65; B60L 53/30;
  (Continued)

(56) References Cited

U.S. PATENT DOCUMENTS

| 10,065,517 B1 * | 9/2018 | Konrardy | ............... G06Q 40/08 |
| 11,763,266 B2 * | 9/2023 | Ma | ........................ G06F 16/252 |
| | | | 340/932.2 |

(Continued)

FOREIGN PATENT DOCUMENTS

| CN | 111223306 A | * | 6/2020 |
| CN | 111259911 A | * | 6/2020 |

(Continued)

*Primary Examiner* — Mahendra R Patel
(74) *Attorney, Agent, or Firm* — Seed IP Law Group LLP

(57) ABSTRACT

A method for reporting a blocking of a charging station by a parking motor vehicle includes, upon fulfillment of a triggering condition, sending a message to a user of the motor vehicle and/or to a device that is external to the charging station, wherein the triggering condition is fulfilled or can only be fulfilled if, after recognition of the occupancy of a parking area assigned to the charging station by a sensor direction, an additional condition is fulfilled, wherein the additional condition is fulfilled or can only be fulfilled if, on the one hand, during an evaluation of image data provided by the sensor device and/or a further sensor device, no feature is recognized which identifies the motor vehicle as potentially being suitable for charging by the charging station, and/or if, on the other hand, a charging connection of the charging station is not connected to a charging connection of the motor vehicle for a predefined minimum time immediately after the recognition of the occupancy of the parking area by the motor vehicle.

9 Claims, 2 Drawing Sheets

(51) Int. Cl.
*G06V 20/52*     (2022.01)
*G06V 20/62*     (2022.01)
*G08B 25/00*     (2006.01)

(52) U.S. Cl.
CPC ........... *G06V 20/63* (2022.01); *G08B 25/001* (2013.01); *G08B 25/006* (2013.01)

(58) Field of Classification Search
CPC ....... B60L 53/31; B60L 53/305; G06V 20/52; G06V 20/625; G06V 20/63; G08B 25/001; G08B 25/006; G08B 21/00; Y02T 10/70; Y02T 10/7072; Y02T 90/12
USPC ........................................................ 382/105
See application file for complete search history.

(56) References Cited

U.S. PATENT DOCUMENTS

| | | | | |
|---|---|---|---|---|
| 2017/0323227 | A1* | 11/2017 | Sadeghi | G06Q 20/102 |
| 2018/0111494 | A1* | 4/2018 | Penilla | G06Q 20/145 |
| 2020/0160478 | A1* | 5/2020 | Ramot | G08G 1/005 |
| 2020/0349617 | A1* | 11/2020 | Rosas-Maxemin | G06N 20/00 |
| 2021/0081624 | A1* | 3/2021 | Kovarik | G01S 13/878 |

FOREIGN PATENT DOCUMENTS

| | | | | |
|---|---|---|---|---|
| DE | 102018117910 A1 * | 1/2019 | | B60L 53/14 |
| DE | 102019128618 A1 * | 4/2021 | | |
| DE | 102019133276 A1 * | 6/2021 | | |
| EP | 2426007 A2 * | 3/2012 | | B60L 11/1824 |
| EP | 3403868 A1 * | 11/2018 | | |
| JP | 2019096103 A * | 6/2019 | | |
| KR | 20190115317 A | 10/2019 | | |
| KR | 20200087883 A | 7/2020 | | |

* cited by examiner

METHOD AND SYSTEM FOR REPORTING THE BLOCKING OF A CHARGING STATION

BACKGROUND

Technical Field

Embodiments of the invention relate to a method for reporting a blocking of a charging station by a parked motor vehicle.

Description of the Related Art

Public charging stations are sometimes used for charging electrically powered vehicles or plug-in hybrids. However, parking areas required for charging a motor vehicle at such a charging station are often blocked by other vehicles. For this reason, publication KR 20200087883 A suggests checking whether a charging current is provided to a motor vehicle within a predefined time interval after recognition of the parking of the motor vehicle in a parking area associated with the charging station. If this is not the case, a message is sent to the server of an authority, for example to trigger towing of the motor vehicle.

Whereas the described method robustly recognizes a blocking of charging stations by uncharged vehicles, it can, however, lead to an unnecessary alert of an authority in case of a failure to charge due to a technical defect. In addition, charging of the vehicle connected to a charging station does not necessarily take place immediately in all applications, by way of example, in specific applications charging is only to take place using surplus electricity from a solar power system.

BRIEF SUMMARY

Some embodiments provide an improved approach for reporting blockings of charging stations, which avoids the above-mentioned problems or can also be used in the above-mentioned applications.

In some embodiments, a message is sent out to a user of the motor vehicle and/or a device that is external to the charging station when a trigger condition is fulfilled, the trigger condition being fulfilled or being able to be fulfilled only if an additional condition is fulfilled after the occupancy of a parking area assigned to the charging station has been recognized by a sensor device. In addition, some embodiments relate to a system for reporting the blocking of a charging station.

Some embodiments provide a method of the type mentioned above, wherein the additional condition is fulfilled or can only be fulfilled if, on the one hand, during an evaluation of image data provided by the and/or a further sensor device, no feature is recognized which identifies the motor vehicle as potentially suitable for charging by the charging station, and/or if, on the other hand, for a predetermined minimum time interval immediately after the recognition of the occupancy of the parking area by the motor vehicle, a charging connection of the charging station is not connected to a charging connection of the motor vehicle.

The method described can, in particular, be used to ensure that a blocking of the charger is only reported if there is no intention to charge at all, which is to say if, by way of example, the motor vehicle parked in the parking area appears unsuitable for charging by the charging station, for example, if it only has an internal combustion engine, or if a necessary action for charging, namely connection to the charging station, is not performed. In so doing, the method is also suitable for applications in which the motor vehicle is not always charged when the motor vehicle is connected to the charging station, and the probability of, for example, incorrectly alerting an authority due to a technical error or an operating error is at least considerably reduced.

The evaluation of the image data in the framework of the additional condition can, in particular, be carried out in such a way that a recognition of a feature is performed which is set up to search out a feature in the image data which identifies the motor vehicle as being potentially suitable for charging by the charging station if the motor vehicle has this feature and it is located in the image area of the image data. Approaches for recognizing or searching out certain features in image data are already well known in the prior art and shall therefore not be explained in detail. It is only if the feature is not found, notwithstanding an attempt at recognition of this feature, that the additional condition in this alternative is fulfilled or can be fulfilled.

A recognition of a connection between the charging connection of the charging station and the charging connection of the motor vehicle can be achieved by using a pilot contact that is known per se or, for example, by using separate sensors.

The device that is external to the charging station may be, for example, a server. The device that is external to the charging station can, for example, be operated by an authority or the operator of the charging station, who can, for example, impose a fine or an increased parking fee in the event of an unjustified blocking of the charging station. However, the device that is external to the charging station can also be operated by a towing service that is automatically notified to tow away the motor vehicle blocking the charging station, or it can, for example, be a mobile communication device of the user. Contact data for this can be determined, for example, by capturing a motor vehicle license plate number or a numeric or alphanumeric registration designation of the motor vehicle that forms the license plate number, making use of a database, or the like.

The sending out of the message to the user can be done, for example, by means of a light signal, a loudspeaker, a display panel or similar means in the area of the parking area.

The sensor device may be, for example, a camera and in said case may also provide the image data. Alternatively, an induction loop can, for example, be used as a sensor device. The further sensor device may be a camera. Cameras can capture single images or videos as image data. Cameras can capture visible light or, additionally or alternatively, infrared radiation.

The evaluation of the image data can be set up to recognize a marking on a number plate of the motor vehicle and/or a sticker attached to the motor vehicle as the feature that identifies the motor vehicle as being potentially suitable for charging by the charging station. For example, in Germany, electric vehicles and plug-in hybrids may use license plates with an "E" added to the registration designation at the end, which is to say, following the group of numbers on standard number plates. This additional letter in this specific position can be easily recognized in image data.

Corresponding vehicles with foreign registration can be identified in Germany by a sticker on the rear window. The presence of such a sticker can also be recognized as a suitable feature.

Similar approaches to marking electric vehicles or alternatively plug-in hybrids that can be charged at charging stations are also common in other countries, so that the method described above can also be used there to recognize motor vehicles that are suitable for charging by the charging station and thereby a non-fulfillment of the additional condition.

As mentioned above, the marking on the number plate can be a letter arranged at a predetermined position on the number plate.

A numeric or alphanumeric registration designation recognized in the image data on the number plate may be matched against a database of registration designations identifying motor vehicles as potentially suitable for charging by the charging station, wherein the additional condition is fulfilled or is fulfillable only if the registration designation is not included in the database. The described method may be useful if a given motor vehicle is not identified by a special marking on the number plate or a sticker. In this case, it could be possible, for example, to store the registration designation, which is also referred to as the vehicle identification number, in a corresponding database and thus make it clear that the motor vehicle is suitable for charging at charging stations and may therefore also, for example, park in the parking areas associated with them. A corresponding database can, for example, be maintained by car manufacturers, non-governmental organizations or authorities.

Alternatively, or additionally, it can be checked whether the number plate or a numeric or alphanumeric registration designation recognized in the image data on the number plate corresponds to a predetermined formation rule, wherein the additional condition is fulfilled or can only be fulfilled if the registration designation does not correspond to the formation rule. By way of example, the addition of the letter "E" to the normal registration designation as explained above can be understood as one such formation rule. Alternatively, it would also be possible, for example, that certain value ranges of a sequence of digits or the like identify motor vehicles suitable for charging at charging stations.

In principle, it would also be possible to identify motor vehicles potentially suitable for charging at the charging station on the basis of their shape or a type designation attached, for example, to the rear end of the car. However, since type designations can easily be manipulated and the external shape of vehicles with different drive technologies is often quite similar, the approaches explained above may be preferred.

In every case in which the additional condition is fulfilled or can only be fulfilled if no feature is recognized during the evaluation of the image data that identifies the motor vehicle as potentially suitable for charging by the charging station, wherein upon fulfillment of the trigger condition the message is sent out to the device that is external to the charging station, it is possible that an additional indication condition can be evaluated, that is fulfilled or can only be fulfilled if, for a predetermined minimum time interval immediately after recognition of occupancy by the motor vehicle of the parking area, a charging connection of the charging station is not connected to a charging connection of the motor vehicle and/or no charging of the motor vehicle by the charging station takes place, wherein, if the indication condition is fulfilled, a further message different from the message is sent out to the user or to the device that is external to the charging station and/or the message or a further message different from the message is sent out to a further device that is external to the charging station and different from the device that is external to the charging station.

By means of the described method, it is possible to distinguish between cases in which, according to the image data, the motor vehicle is prospectively not suitable for charging by the charging station, which is to say there is a fulfillment of the additional or trigger condition, and cases in which the motor vehicle would potentially be suitable for charging by the charging station, but such charging or a connection to the charging station does not take place. This makes it possible, for example, to initiate more stringent measures, in particular immediate towing, if the vehicle does not appear to be a vehicle suitable for charging at the charging station. For example, a message initiating a towing operation can be sent to a device of an authority or towing service that is external to the charging station if the trigger condition is met. If, on the other hand, only the indication condition is fulfilled, it may be sufficient to inform the user that the parking area should exclusively to be used when charging is to take place, or, for example, to charge a higher parking fee, since users of vehicles suitable for charging are in any case already sensitized to potential blockings of charging stations and therefore, in all cases, a short blocking without a charging process is to be expected.

When the error condition is fulfilled, it is possible that the image data or the processing data determined from the image data, in particular the registration designation, can be transmitted to the device that is external to the charging station and/or be stored in the charging station. This can be used to secure evidence, for example, to justify towing or to justify a later penalty payment. In this context, storage in the charging station means, in particular, long-term storage or storage by a storage device that also stores these data without power, for example, using a flash memory. For example, the image data, or alternatively the processing data may be deleted immediately or after a predetermined time interval if the error condition is not fulfilled, and it can only be stored if the error condition is fulfilled beyond its verification or alternatively after the end of the time interval.

The device that is external to the charging station or the further device that is external to the charging station can be used to provide information to further motor vehicles relating to the availability of the charging station, wherein the charging station is marked as occupied after receipt of the message or receipt of the further message and continuously until receipt of a release message. The further device that is external to the charging station can, in particular, provide availability information for several charging stations. Charging stations used for charging motor vehicles can in any case report their use and thus their occupancy. However, if a charging station is blocked because a motor vehicle is parked in its parking area without being charged, this is not normally recognized. The proposed method can also be used to inform other motor vehicles or their users that a charging station is blocked in this way and is not currently available.

The release message can be sent, for example, by the charging station or a processing device that processes the image data or other sensor data of the sensor device to determine whether the parking area is occupied, if it is recognized that the parking area is unblocked. Alternatively, or additionally, an authority or a towing company can, for example, send a corresponding release message after a motor vehicle blocking the charger has been towed away from the parking area.

Some embodiments provide a system for reporting a blocking of a charging station by a parked motor vehicle, which system has at least one sensor device for recognizing the occupancy of a parking area assigned to the charging station, a processing device and a notification output device for sending out a message to a user of the motor vehicle and/or a device that is external to the charging station, wherein the system is set up to carry out the method described herein. The processing device can, in particular, be set up to carry out the method described herein, specifically to check the triggering condition or alternatively the additional condition and to control the notification output device in the event that the triggering condition is fulfilled.

The sensor device can be set up to provide image data and can be, for example, a camera. Additionally, or alternatively, the system may comprise a further sensor device that provides the image data. The charging station or at least one device for recognizing the connection of the charging connection of the charging station to the charging connection of the motor vehicle may be part of the system.

The other components mentioned in the explanations of the method can also be part of the system or have the above-mentioned properties with the above-mentioned advantages.

BRIEF DESCRIPTION OF THE SEVERAL VIEWS OF THE DRAWINGS

Further advantages and details are shown in the following embodiments and the associated drawings.

DETAILED DESCRIPTION

Figure 1:
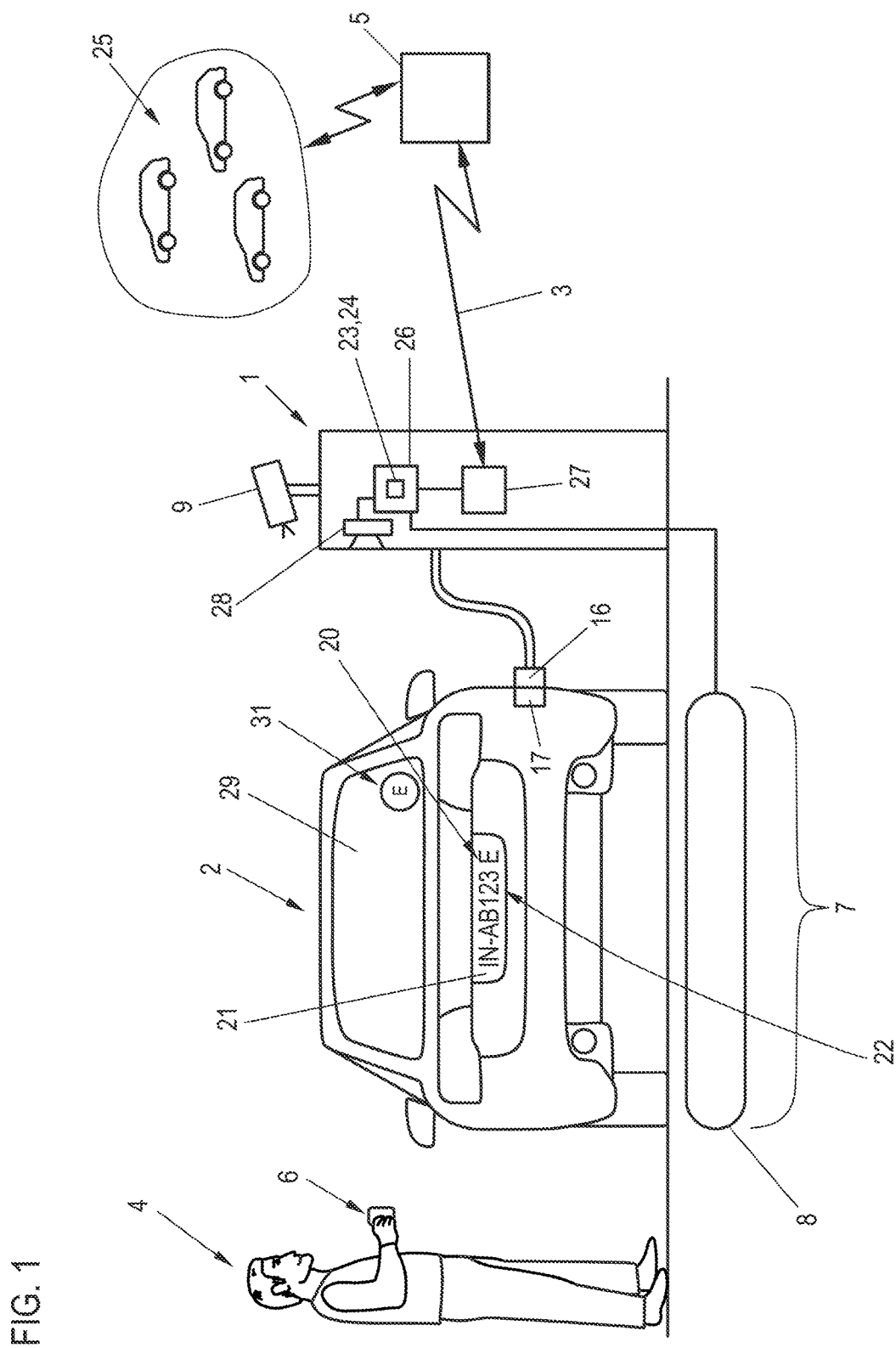
FIG. 1 shows an embodiment of the system for reporting the blocking of a charging station, by which an embodiment of the method for reporting a blocking of the charging station is carried out.

FIG. 1 shows a system for reporting the blocking of a charging station 1 by a parked motor vehicle 2. In the example, the system is integrated into the charging station 1, but the components of the system could at least also partially be formed separately from the charging station 1. For example, the processing device 26 could be formed by a server that is located separate from the charging station 1.

In the example, the charging station 1 largely corresponds to a conventional charging column. To charge a motor vehicle 2, the vehicle is parked in a parking area 7 assigned to the charging station 1 and a charging connection 16 of the charging station 1 is connected to a charging connection 17 of the motor vehicle 2.

In the example shown, the motor vehicle 2 is indeed an electric vehicle being charged by the charging station 1. However, if there were another motor vehicle 2 in the parking area 7, for example a motor vehicle 2 that can be driven exclusively by an internal combustion engine and that cannot be charged by the charging station 1, the charging station 1 would be blocked and could not be used for the charging of motor vehicles 2.

Figure 2:
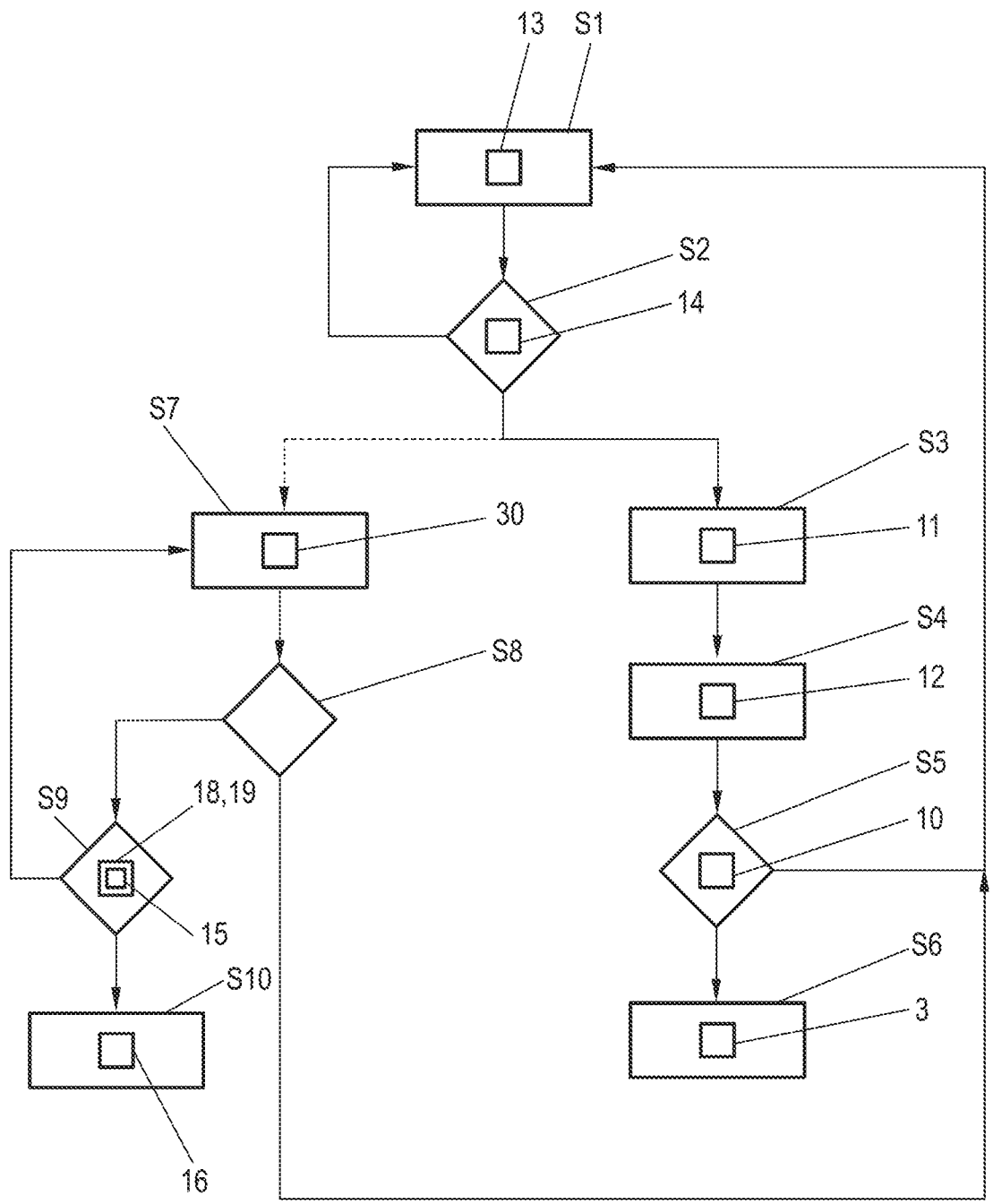
FIG. 2 shows a flow chart of an embodiment of the method.

In order to inform the user 4 in this case that the motor vehicle 2 should not be parked in the parking area 7 or to send a message 3 to a device 5 external to the charging station, for example, in order to request towing of the motor vehicle 2 by a towing service or an authority, a method is used which is explained below with additional reference to FIG. 2 and the processing steps of which are implemented by a processing device 26 of the system, which in the case in point is integrated in the charging station 1.

In step S1, sensor data 13 is first acquired by a sensor device 8, in the example by an induction loop, and in step S2, on the basis of this sensor data 13 it is checked whether an occupancy condition 14 is fulfilled, which is to say whether a motor vehicle 2 is located in the parking area 7. Steps S1 and S2 are repeated until the occupancy condition 14 in step S2 is fulfilled.

After the occupancy condition 14 has been fulfilled, image data 11 is acquired in step S3 by the sensor device 9, which is in the form of a camera. In principle, it would also be possible to use the sensor device 9 instead of the sensor device 8 to acquire the sensor data 13, in which case the occupancy of the parking area 7 could be determined, for example, by evaluating corresponding image data.

In step S4, the image data 11 is evaluated in order to recognize features 12 that identify the motor vehicle 2 as potentially suitable for charging by the charging station 1. Examples of this will be explained in more detail later.

In step S5, it is then checked whether an additional condition 10 is fulfilled, which is only fulfilled if no suitable feature 12 was recognized on the motor vehicle 2 in step S4. If the additional condition 10 is not fulfilled, the method is first ended and, in particular after a certain time delay or after a recognition of the freeing up of the parking area 7, is repeated from step S1.

If, on the other hand, the additional condition 10 is fulfilled in step S5, then in step S6 a message 3 is sent out via the notification output device 27 to the device 5 that is external to the charging station, which may be, for example, a server of a charging station operator, an authority or a towing service. The message 3 can be used, for example, to request towing of the motor vehicle 2, to request payment of a penalty or parking fee, or the like.

Additionally, or alternatively, messages 3 can also be sent to the device 6 that is external to the charging station, namely to a mobile communication device of the user 4, or they can be sent out directly to the user 4 via the notification output device 28, which in the example is a loudspeaker.

Whereas the occupancy condition 14 and the additional condition 10 are evaluated separately and sequentially in the flowchart shown, they can also be considered as sub-conditions of a triggering condition that is fulfilled only when both the occupancy condition 14 and the additional condition 10 are fulfilled, which is to say, when the additional condition 10 is fulfilled after the occupancy of the parking area 7 is recognized.

The image data can, in particular, be of the rear side of the motor vehicle 2 and specifically depict the number plate 21.

In the example of FIG. 1, since the motor vehicle 2 is suitable for charging by the charging station 1, it has features 12 identifying this. Therefore, if these features 12 were recognized, the additional condition 10 would not be fulfilled.

By way of example, the number plate 21 may have a marking 20 as a feature 12, in the case in point, the letter "E" at the end of the registration designation 22, which indicates that the motor vehicle is suitable for charging by the charging station 1. Such marking of electric vehicles or plug-in hybrids, for example, is done on number plates of motor vehicles registered in Germany.

However, a suitable feature 12 can also, for example, be a sticker 31 attached to the rear window 29. Such a sticker is, for example, used in Germany to identify electric vehicles or plug-in hybrids registered abroad, so that a potential suitability of the motor vehicle for charging by the charging station 1 can be recognized on the basis of this feature 12.

Additionally, or alternatively, the alphanumeric registration designation 22 can be recognized by evaluating the image data. Subsequently, for example, a database 23 stored in the processing device 26 or existing formation rules 24 can be used to check whether this registration designation 22 forms a feature 12 that identifies the motor vehicle 2 as potentially suitable for charging at the charging station 2.

As shown by the dashed arrow between steps S2 and S7, steps S7 through S10 are optional. Initially, it will be assumed that these steps serve to evaluate an additional indication condition 19. However, as will be explained later, steps S7 to S10 can also replace steps S3 to S6.

In step S7, immediately after the occupancy condition 14 has been fulfilled, a time counter is set to zero and is incremented in each of the subsequent repetitions of step S7. In step S8, it is then checked whether the charging connection 16 of the charging station 1 is connected to the charging connection 17 of the motor vehicle 2. If this is the case, it is assumed that the motor vehicle 2 is parked in the parking area 7 for charging the motor vehicle 2, which is why the method can initially be ended and, for example, repeated again from step S1 after a certain waiting time or the freeing up of the parking area 7 by the motor vehicle 2.

If, on the other hand, no corresponding connection is recognized in step S8, the indication condition 19 is evaluated in step S9, which compares the value of the time counter 30 with the minimum time 15. If this minimum time is not met, the method is repeated from step S7, which is to say the time counter 30 is first incremented.

If, on the other hand, the minimum time 15 is reached or exceeded, message 16 is sent out in step S10, which can be done as explained above for message 3. In some cases, however, the content of the messages 3 and 16 and/or the addressee of the messages 3 and 16 are different here. By way of example, the message 16 can be sent out to the user 4 by means of the loudspeaker 28 or indirectly by means of the device 6 that is external to the charging station in order to alert them to the need for charging when the motor vehicle 2 is parked, whereas the message 3 is transmitted to the device 5 that is external to the charging station in order to trigger towing of the motor vehicle 2, payment of a fine or the like.

In a variation of the described method, instead of the connection of the charging connections 16, 17 or in addition thereto, in step S8 it could be checked whether a charging current is flowing for the charging of the motor vehicle 2 or of its energy storage device.

As mentioned above, the steps S7 to S10 can also replace steps S3 to S6. In this case, steps S3 to S6 can be omitted and an additional condition 19 can be checked in step S9, which, like the indication condition explained above, also compares the value of the time counter 30 with the minimum time 15 and is therefore named differently solely for consistency reasons with the general description.

Upon fulfillment of the additional condition 10, 19 or alternatively the triggering condition, it can be useful to document the incorrect occupancy of the parking area 7 by a motor vehicle. For this purpose, it is, for example, possible to locally store the image data 11 or processing information determined therefrom, for example the registration designation 22, in the charging station 1 or alternatively transmitted to the device that is external to the charging station 5.

The device 5, 6 that is external to the charging station or a further device that is external to the charging station to which the message 3 or 16 is transmitted can be used to provide information relating to the availability of the charging station 1 to further motor vehicles 25.

After receiving one of the messages 3, 16, the charging station 1 can first be marked as occupied, since it is blocked by the parked motor vehicle 2 even if no charging is taking place. Subsequently, the charging station 1 can send a release message when it recognizes that the motor vehicle 2 has left the parking area 7, or a towing service or an authority can send a corresponding release message after the motor vehicle 2 has been removed, after which the corresponding charging station 1 can be marked as free again.

German patent application no. 10 2021 128710.3, filed Nov. 4, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for reporting a blocking of a charging station by a parked motor vehicle, comprising:
    upon fulfilment of a triggering condition, sending a message to a user of the motor vehicle and/or a device that is external to the charging station, wherein the triggering condition is fulfilled if an additional condition is fulfilled after recognition of occupancy of a parking area assigned to the charging station by a sensor device,
    wherein the additional condition is fulfilled if, during an evaluation of image data provided by the sensor device and/or a further sensor device, no feature is recognized which identifies the motor vehicle as potentially being suitable for charging by the charging station, and/or if a charging connection of the charging station is not connected to a charging connection of the motor vehicle for a predefined minimum time immediately after the recognition of the occupancy of the parking area by the motor vehicle,
    wherein the evaluation of the image data is set up to recognize, as the feature which identifies the motor vehicle as potentially suitable for charging by the charging station, a marking on a number plate of the motor vehicle and/or a sticker attached to the motor vehicle,
    wherein a numeric or alphanumeric registration designation recognized in the image data on the number plate is matched with a database of registration designations identifying motor vehicles as potentially suitable for charging by the charging station, wherein the additional condition is fulfilled if the registration designation is not included in the database, and
    wherein the additional condition is fulfilled if, during the evaluation of the image data, no feature is recognized which identifies the motor vehicle as potentially suitable for charging by the charging station, wherein, when the triggering condition is fulfilled, the message is sent out to the device that is external to the charging station.

2. The method according to claim 1, wherein the marking on the number plate is a letter arranged at a predetermined position on the number plate.

3. The method according to claim 1, further comprising:
    checking whether the registration designation recognized in the image data on the number plate corresponds to a predetermined formation rule, wherein the additional condition is fulfilled if the registration designation does not correspond to the formation rule.

4. The method according to claim 1,
    wherein, an indication condition is additionally evaluated which is fulfilled if a charging connection of the charging station is not connected to a charging connection of the motor vehicle for a predefined minimum time immediately after the recognition of the occupancy of the parking area by the motor vehicle and/or no charging of the motor vehicle takes place by the charging station, wherein upon fulfillment of the indication condition, a further message that is different from the message is sent out to the user or to the device that is external to the charging station and/or the message or a further message that is different from the message is sent out to a further device that is external to the charging station and different from the device that is external to the charging station.

5. The method according to claim 1, wherein, upon fulfillment of an error condition, the image data or processing data determined from the image data, in particular the registration designation, are transmitted to the device that is external to the charging station and/or stored in the charging station.

6. The method according to claim 1, wherein the device that is external to the charging station or a further device that is external to the charging station is used to provide information to further motor vehicles pertaining to availability of the charging station, wherein after receipt of the message or a further message, up until receipt of a release message, the charging station is marked as occupied.

7. A system, comprising:
- at least one sensor device for recognizing occupancy of a parking area assigned to a charging station,
- a processing device, and
- a notification output device for sending out a message to a user of a motor vehicle and/or a device that is external to the charging station,
- wherein the system is set up for carrying out a method for reporting a blocking of the charging station by the motor vehicle, comprising:
- upon fulfilment of a triggering condition, sending a message, by the notification output device, to the user of the motor vehicle and/or the device that is external to the charging station, wherein the triggering condition is fulfilled if an additional condition is fulfilled after recognition of occupancy of the parking area assigned to the charging station by the sensor device,
- wherein the additional condition is fulfilled if, during an evaluation of image data provided by the sensor device and/or a further sensor device, no feature is recognized which identifies the motor vehicle as potentially being suitable for charging by the charging station, and/or if a charging connection of the charging station is not connected to a charging connection of the motor vehicle for a predefined minimum time immediately after the recognition of the occupancy of the parking area by the motor vehicle,
- wherein the evaluation of the image data is set up to recognize, as the feature which identifies the motor vehicle as potentially suitable for charging by the charging station, a marking on a number plate of the motor vehicle and/or a sticker attached to the motor vehicle,
- wherein a numeric or alphanumeric registration designation recognized in the image data on the number plate is matched with a database of registration designations identifying motor vehicles as potentially suitable for charging by the charging station, wherein the additional condition is fulfilled if the registration designation is not included in the database, and
- wherein the additional condition is fulfilled if, during the evaluation of the image data, no feature is recognized which identifies the motor vehicle as potentially suitable for charging by the charging station, wherein, when the triggering condition is fulfilled, the message is sent out to the device that is external to the charging station.

8. The system according to claim 7, wherein the sticker attached to the motor vehicle identifies the motor vehicle as an electric vehicle or plug-in hybrid vehicle that is registered, so that a suitability of the motor vehicle for charging by the charging station is recognized.

9. The method according to claim 1, wherein the sticker attached to the motor vehicle identifies the motor vehicle as an electric vehicle or plug-in hybrid vehicle that is registered, so that a suitability of the motor vehicle for charging by the charging station is recognized.

* * * * *